(12) United States Patent
Sieber et al.

(10) Patent No.: US 7,255,081 B2
(45) Date of Patent: Aug. 14, 2007

(54) METHOD AND DEVICE FOR IMPROVING THE STARTING RESPONSE OF AN INTERNAL COMBUSTION ENGINE

(75) Inventors: Udo Sieber, Bietigheim (DE); Jochen Laubender, Stuttgart (DE); Andre-Francisco Casal Kulzer, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 29 days.

(21) Appl. No.: 10/552,226

(22) PCT Filed: Mar. 4, 2004

(86) PCT No.: PCT/DE2004/000411

§ 371 (c)(1),
(2), (4) Date: Oct. 6, 2005

(87) PCT Pub. No.: WO2004/104410

PCT Pub. Date: Dec. 2, 2004

(65) Prior Publication Data
US 2006/0278202 A1 Dec. 14, 2006

(30) Foreign Application Priority Data
May 9, 2003 (DE) ................ 103 22 361

(51) Int. Cl.
*F02M 1/00* (2006.01)
*F02D 41/06* (2006.01)
*F02N 17/00* (2006.01)

(52) U.S. Cl. ............... 123/179.17; 123/179.1; 123/179.4; 123/179.16; 123/179.18; 123/179.21; 123/520

(58) Field of Classification Search ............. 123/179.5, 123/179.17, 179.1, 179.18
See application file for complete search history.

(56) References Cited

U.S. PATENT DOCUMENTS

| | | | |
|---|---|---|---|
| 4,364,343 A * | 12/1982 | Malik ..................... | 123/179.4 |
| 5,074,263 A * | 12/1991 | Emerson ................. | 123/179.5 |
| 6,050,232 A | 4/2000 | Grob et al. | |
| 6,679,214 B2 * | 1/2004 | Kobayashi et al. ...... | 123/179.4 |
| 6,718,928 B2 * | 4/2004 | Brueggen et al. ........ | 123/179.5 |
| 6,834,632 B2 * | 12/2004 | Kataoka et al. .......... | 123/179.4 |
| 6,981,481 B2 * | 1/2006 | Kojima et al. ........... | 123/179.3 |
| 7,028,656 B2 * | 4/2006 | Tsuji et al. .............. | 123/179.16 |
| 7,066,128 B2 * | 6/2006 | Satake et al. ............ | 123/179.4 |
| 2002/0166531 A1 | 11/2002 | Ackermann et al. | |

* cited by examiner

*Primary Examiner*—Tony M. Argenbright
*Assistant Examiner*—J. Page Hufty
(74) *Attorney, Agent, or Firm*—Michael J. Striker

(57) ABSTRACT

The present invention relates to methods for charging at least one combustion chamber (12) of a spark-ignition combustion engine (10) with fuel and air. At least one combustion chamber charge is produced during a shutoff phase of the internal-combustion engine (10) and is ignited when the internal-combustion engine (10) is subsequently started. The methods are characterized in that, during the shutoff phase, at least one measure is taken to produce a high percentage of fuel vapor in the combustion chamber charge. The present invention also relates to a control unit for controlling the methods.

9 Claims, 3 Drawing Sheets

METHOD AND DEVICE FOR IMPROVING THE STARTING RESPONSE OF AN INTERNAL COMBUSTION ENGINE

CROSS-REFERENCE

The invention described and claimed hereinbelow is also described in PCT/DE2004/000411, filed on Mar. 4, 2004 and DE 103 22 361.4, filed on May 9, 2003. This German Patent Application, whose subject matter is incorporated here by reference, provides the basis for a claim of priority of invention under 35 U.S.C. 119 (a)-(d).

BACKGROUND OF THE INVENTION

The present invention relates to methods for charging at least one combustion chamber of a spark-ignition combustion engine with fuel and air, at least one combustion chamber charge being produced during a shutoff phase of the internal-combustion engine and being ignited when the internal-combustion engine is subsequently started. The present invention also relates to an electronic control unit that controls a method of this type.

Conventional internal combustion engines are started with the aid of an independently-driven starter. The independently-driven starter, usually an electric starter, turns the internal combustion engine over, the internal combustion engine then drawing air or a mixture of fuel and air into its combustion chambers. The combustion chamber charges are ignited in succession while the crankshaft of the internal combustion engine is rotating. Torque is therefore produced in succession, which enables the internal combustion engine to continue turning over under its own power.

Methods are known for starting internal combustion engines with direct injection of fuel into combustion chambers of internal combustion engines that operate without electric-motor starters. To generate starting torque, fuel is injected into an air charge of a combustion chamber while the internal combustion engine is at a standstill and its pistons are in a power-stroke position. Ignition is then carried out, producing combustion. In the ideal case, the combustion produces a level of torque that is sufficient to start the internal combustion engine.

Within the framework of the known method, fuel is injected into the static air charge in the cylinder shortly before the first ignition. The short time period between injection and ignition is usually not long enough to obtain a homogeneous fuel/air mixture. A homogeneous fuel/air mixture is understood to mean the most uniform distribution of fuel particles possible in the combustion chamber charge.

With the known method of injecting fuel into the static air quantity, typically only fuel/air mixtures with an excess quantity of air are obtained for the initial combustions. The excess air results from the fact that a large portion of the injected fuel condenses, as wall-applied film, on the cold cylinder walls and the cold piston surface. In addition, only small fuel droplets can evaporate completely in the short period of time between injection and ignition.

As a result, a large portion of the injected fuel mass is not involved in combustion. Unburned fuel therefore enters the exhaust gas. This results in higher emissions and higher specific fuel consumption. In addition, the percentage of potential thermodynamic energy in the combustion chamber charge that is converted to mechanical work at start-up can be so small due to insufficient mixture formation that the starting response of the internal combustion engine is negatively affected. This is a disadvantage, in particular, when the impairment of the starting response should not or can not be compensated for by an independently-driven starter (e.g., an electric starter).

Based on these facts, the object of the present invention is to provide a method and a control unit for improving the starting response of the internal combustion engine.

This object is obtained with a method of the type described initially by the fact that, during the shutoff phase itself, at least one measure is carried out to produce a high percentage of fuel vapor in the combustion chamber charge.

This object is furthermore obtained with a control unit of the type described initially by the fact that the control unit controls a method of this type.

SUMMARY OF THE INVENTION

The object of the present invention is fully obtained via these features. By producing a high percentage of fuel vapor in the combustion chamber charge that will not be ignited until subsequent starting, a more homogeneous distribution of the fuel in the combustion chamber charge with air is obtained. The ignitability of the combustion chamber charge is improved as a result. In addition, the percentage of fuel in the combustion chamber involved in combustion increases. As a result of the more complete combustion of the combustion chamber charge, more torque is developed and pollutant emissions are reduced.

The resultant improvement in starting response enables realization of the direct-start principle in a stop-start system, in the case of which the internal combustion engine is stopped and then restarted, e.g., at a red light in city traffic. For this to be realized, reliable direct-start capability based on improved starting response is required, as is attained with the present invention.

The present invention is not limited to use in conjunction with direct injection of fuel in combustion chambers of an internal combustion engine or to use in conjunction with direct-start capability. It can also be used with engines with intake-manifold injection with and without direct-start capability, to improve the starting response overall and reduce emissions upon start-up of the internal combustion engine. The improved starting response enables realization of a stop-start functionality even when the starting procedure is supported by an independently-driven starter, the stop-start functionality being used by a growing number of end customers due to the improved and more reliable starting response.

Preferably, the measure for producing a high percentage of fuel vapor is to open a canister-purge valve when the internal combustion engine is shut off.

Via this measure, more than just pure fresh air is drawn in during the final power strokes of the internal combustion engine when it is shut off, as is the case with conventional engine management systems. With internal combustion engines controlled in the conventional manner, the fuel injection and ignition are shut off when the engine slows to a halt. Within the framework of this embodiment, instead, a pre-mixed fuel/air mixture is scavenged by the cylinders. The premixed state results from the fact that, when the canister-purge valve is open, air is suctioned through a charcoal filter containing fuel, and picks up fuel as it passes through.

Since a fuel/air mixture is drawn in via tank ventilation, when the internal combustion engine is at a standstill, a homogenized mixture composition is already available in the combustion chambers of the internal combustion engine. During subsequent starting, either no fuel or only a reduced quantity of fuel need be injected to achieve complete combustion of the combustion chamber charge. By drawing in gaseous fuel or fuel vapor, and as a result of the associated reduction in fuel quantity injected in liquid form, the formation of wall-applied fuel film on the piston and cylinder walls is prevented or at least reduced. As a result, pollutant emissions at start-up are reduced. In particular, the emission of hydrocarbons during the starting phase is markedly reduced, which also reduces the specific fuel consumption of the internal combustion engine.

Furthermore, it is preferred that the measure is carried out only above a predetermined temperature threshold value.

In principle, scavenging the combustion chambers with fuel vapor/air mixture via tank ventilation when the internal combustion engine is shut off and with the ignition switched off can result in hydrocarbons entering the exhaust-gas system, unburned. Due to the fact that the scavening takes place only above a predetermined temperature, it can be ensured that hydrocarbons of this type in the exhaust-gas system can be converted by a catalytic converter that is sufficiently warm and, therefore, ready to operate.

A further advantage of this embodiment is that the catalytic converter, when shut off, still receives heat in a pulsed manner from the exothermic reaction of unburned hydrocarbons in the catalytic converter. This is an advantage, because, with start-stop operation, it must be ensured that, during the phases when the internal combustion engine is shut off, the operating temperature of the catalytic converter does not fall below a minimum temperature, below which sufficient conversion is not ensured. If the minimum temperature is fallen below, it would not be possible to convert increased levels of hydrocarbon emissions when starting. By actuating the canister-purge valve in a defined manner when the internal combustion engine is shut off, unburned fuel-air mixture can be deliberately delivered to the catalytic converter in order to heat up the catalytic converter. As a result, cooling of the catalytic converter when the internal combustion engine is at a standstill is delayed. The stop phases in start-stop operation can therefore be effectively extended.

It is also preferable, with a multiple-cylinder internal combustion engine, for fuel to be metered, during a shutoff phase, only into those combustion chambers whose pistons are positioned in the power stroke or compression stroke when the internal combustion engine is at a standstill.

With this embodiment, the evaporation of fuel can also be improved if the fuel was injected in the combustion chambers in liquid form. A suitable time period for injection is, in particular, the swing-down phase shortly before the internal combustion engine comes to a standstill, during which none of the pistons is passing through top-dead center (TDC) of the compression stroke. The "swing-down phase" is understood to be the period of time in which the pistons spring back when ignition is shut off, due to gas spring forces.

It is preferable to inject fuel even during the swing-down phase into the cylinders that are still positioned in the power stroke (after compression TDC) or the compression stroke (before compression TDC). The result is that the mixture of air and fuel enclosed in the combustion chambers is alternately compressed and allowed to expand in the cylinders while the pistons are swinging to a halt. As a result, a brief temperature increase is induced in the cylinders, which results in improved evaporation of the fuel, from fuel droplets in the air charge and from fuel condensed on the walls. Furthermore, the alternating compression and expansion produces local turbulence in the combustion chambers of both cylinders involved, the turbulence resulting in improved homogenization of the fuel/air mixture in the combustion chambers.

If necessary, additional fuel can be metered into various cylinders using one or more additional fuel injections before or during the next start phase and until idle speed is reached, to achieve the most homogenous and complete combustion possible. Using this approach as well, the problems that generally exist during start-up, such as fuel condensation on the walls and increased start-up emissions, can be effectively reduced.

A further preferred embodiment is characterized in that, with an internal combustion engine with variable valve control, exhaust valves of the combustion chambers are opened with delay or not at all.

As a result of this embodiment, the mixture remains in the combustion chambers for a longer period of time. As a result, during swing-down, only partial quantities of the enclosed fuel/air mixture enter the exhaust-gas system via an exhaust valve that opens early. The quantity of fuel that escaped would not be available in the subsequent start phase and would therefore have to be injected as liquid fuel, resulting in the risk of fuel condensing on the walls again. This risk is reduced by latent closing. In the extreme case, with fully variable valve control, the exhaust valves can also remain completely closed.

It is also preferable, with a multiple-cylinder internal combustion engine, to meter fuel into at least one combustion chamber during a shutoff phase and to discharge it from the combustion chamber, unburned.

As a result of this embodiment, the catalytic converter can be heated as desired. To achieve this, small partial quantities of the fuel/air mixture from the combustion chambers are deliberately delivered to the exhaust-gas system during the swing-down phase by opening the exhaust valves early. As a result, the catalytic converter heats up due to exothermic reactions in the catalytic converter. As a result, the cooling-down of the catalytic converter can be effectively delayed; this results in longer stop phases during start-stop operation.

This embodiment is preferably carried out only above a temperature threshold value that corresponds to the temperature at the start of conversion in the catalytic converter ((light-off temperature).

It is furthermore preferred that, in the case of an internal combustion engine with variable compression, the compression is increased when the internal combustion engine is shut off.

The higher compression results in an even greater temperature increase in the individual compression cycles during the swing-down phase. Evaporation of the fuel is enhanced even further as a result.

Within the framework of a further preferred embodiment, compression is also reduced at start-up.

The advantage of this embodiment is that less compression work need be carried out during a subsequent start; this is an advantage in terms of starting the internal combustion engine.

A supplementary approach for quickly preparing the mixture and effectively reducing untreated emissions during cold start is provided by the use of starting fuels with a high percentage of highly volatile components. This starting fuel is used only to start the internal combustion engine. The process subsequently switches to operation using conventional fuel.

The use of highly volatile fuels with high vapor pressure has the advantage that, e.g., when fuel is metered during the swing-down phase, the alternating compression results in more extensive evaporation than is the case with conventional fuel, thereby resulting in even better and faster homogenization and mixture preparation for the subsequent start.

The measures described can also be combined with each other to obtain the best possible homogenization and preparation of the fuel/air mixture in the combustion chambers.

A preferred embodiment of a control unit is characterized by the fact that it controls at least one of the methods described above.

Further advantages result from the description and the attached figures.

It is understood that the features mentioned above and to be described below can be used not only in the combination described, but also in other combinations or alone without leaving the framework of the present invention.

BRIEF DESCRIPTION OF THE DRAWINGS

Exemplary embodiments of the present invention are presented in the drawing and are described in greater detail in the description below.

DETAILED DESCRIPTION OF THE EXEMPLARY EMBODIMENTS

Figure 1:
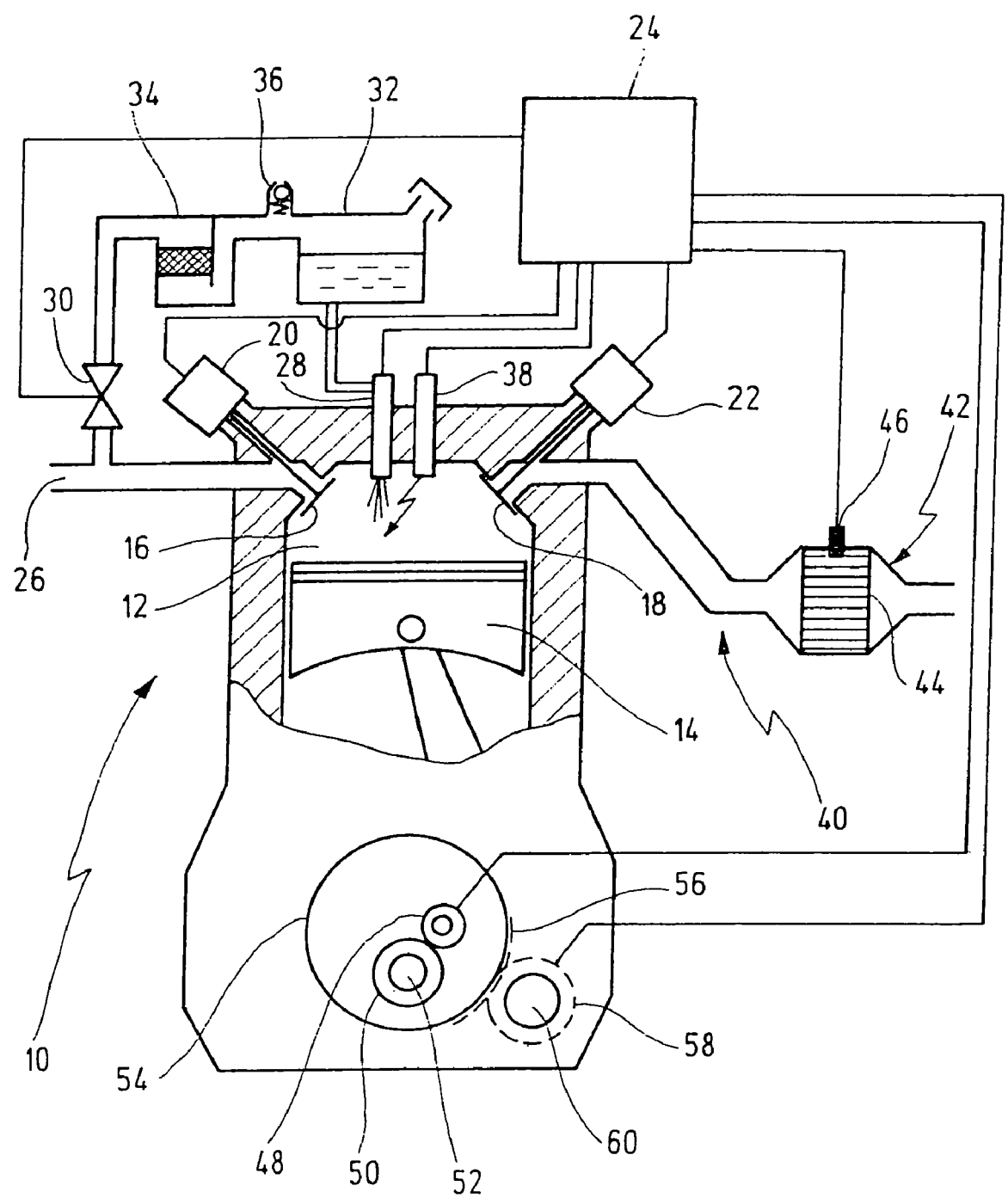
FIG. 1 Shows a schematic depiction of an internal combustion engine with peripheral devices, in a partial cross section.

FIG. 1 shows a schematic depiction of the overall view of an internal combustion engine 10, in a partial cross section.

Internal combustion engine 10 includes at least one combustion chamber 12 that is sealed shut in a movable manner by a piston 14. The charging of combustion chamber 12 with fuel/air mixture and with burned residual exhaust gas resulting from combustion of the fuel/air mixture is controlled by at least one intake valve 16 and at least one exhaust valve 18. To this end, intake valve 16 is coupled with an intake-valve control element 20, and exhaust valve 18 is coupled with an exhaust-valve control element 22. Intake-valve control element 20 and exhaust-valve control element 22 can be realized as cams, the phase positions of which—relative to each other and/or to the crankshaft of internal combustion engine 10—are fixedly predetermined or are variable. As an alternative, intake-valve control element 20 and exhaust-valve control element 22 can be realized as electromagnetic, electrohydraulic or electropneumatic actuators that are triggered to open and close by a control unit 24.

When intake valve 16 is open and piston 14 is traveling upward, air or a mixture of fuel and air is drawn from an intake manifold 26 into the at least one combustion chamber 12. An appropriate quantity of fuel is metered into the quantity of intake air via an injection valve 28 as liquid fuel or via a canister-purge valve 30 as vaporous fuel. In FIG. 1, injection valve 28 is positioned such that it meters fuel directly into the at least one combustion chamber 12. This arrangement is not absolutely necessary, however. As an alternative to this arrangement, injection valve 28 can also be positioned such that it injects fuel into intake manifold 26, e.g., upstream of intake valve 16.

Vaporous fuel can be delivered to internal combustion engine 10 via canister-purge valve 30, the vaporous fuel having evaporated previously in fuel tank 32 and having been stored for the interim in a charcoal filter 34. When canister-purge valve 30 is open and piston 14 is traveling downward and intake valve 16 is open, fuel vapor is drawn in from charcoal filter 34 and tank 32. By way of a spring-loaded ventilation valve 36, outside air can flow into tank 32 and the lines, thereby preventing damage to fuel tank 32 by intake vacuum.

The charging of combustion chamber 12 with air and fuel that is compressed when intake valve 16 and exhaust valve 18 are closed is ignited by a spark plug 38, the externally-supplied ignition being triggered by a control command from control unit 24. Once combustion is complete, piston 14—which has since travelled downward—travels upward again and expels the burned residual gasses via open exhaust valve 18 into an exhaust-gas system 40.

Exhaust-gas system 40 includes a catalytic converter 42 that has catalytic surfaces 44 on which pollutants in the exhaust are catalytically converted. As an option, catalytic converter 42 can be coupled with a temperature sensor 46 that detects the temperature in catalytic converter 42 and outputs a corresponding signal to control unit 24. A temperature signal of this type can also be formed based on operating parameters of the internal combustion engine, such as rotational speed, charge quantity in combustion chamber 12 and moment of ignition based on an arithmetic model in control unit 24. When a temperature is determined using a model of this type—the temperature preferably being the temperature of catalytic converter 42—temperature sensor 46 can be eliminated.

Furthermore, internal combustion engine 10 is equipped with an electric starter 48 that is coupled to a crankshaft toothed wheel 50, electric starter 48 being capable of driving a crankshaft 52 of internal combustion engine 10 via crankshaft toothed wheel 50.

Within the framework of an optional embodiment of the present invention, internal combustion engine 10 has variable compression. It is known that the compression ratio E is the combustion chamber volume plus piston displacement, divided by total combustion chamber volume. The combustion chamber volume is the volume in combustion chamber 12 when piston 14 is at top-dead center, and piston displacement is the volume displaced by piston 14 as it travels from top-dead center to bottom-dead center (and vice versa).

To realize variable compression, crankshaft 52 can be supported eccentrically in an eccentric ring 54 which, in turn, is rotatably supported in the engine block of internal combustion engine 10. To this end, eccentric ring 54 has toothing 56 that meshes with toothing 58 on an actuator 60. Actuator 60 can be an electric motor, for example, that is controlled by control unit 24. The level at which crankshaft 52 is supported in internal combustion engine 10 is varied by rotating eccentric ring 54. If the support of crankshaft 52 is displaced upwardly, the final compression volume is reduced and the compression ratio is increased accordingly. The position of crankshaft 52 and eccentric ring 54 shown in FIG. 1 does not promote low compression, however.

Figure 2:
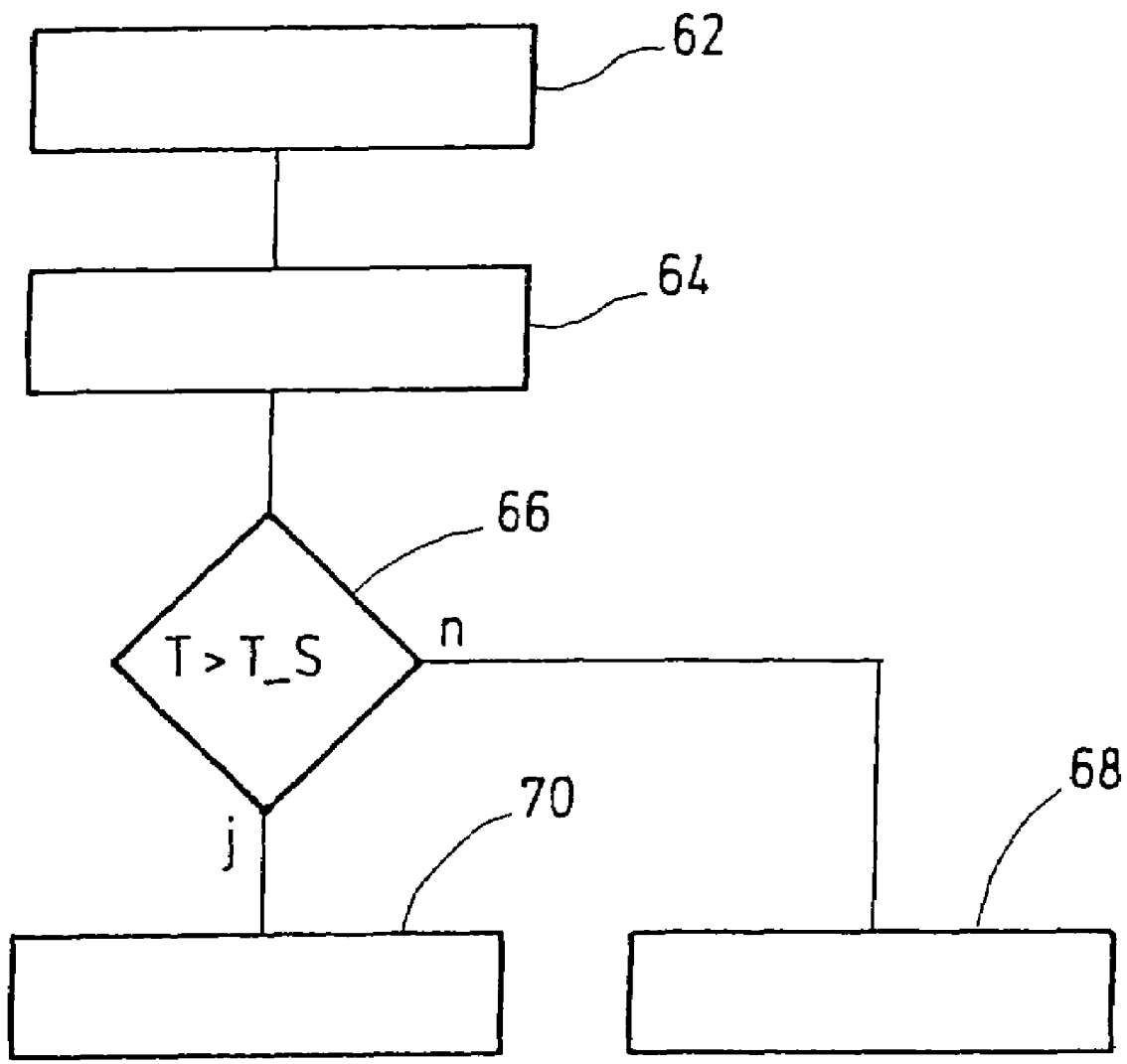
FIG. 2 Shows an exemplary embodiment of a program method as a flow chart of a program for controlling the internal combustion engine.
Figure 3:
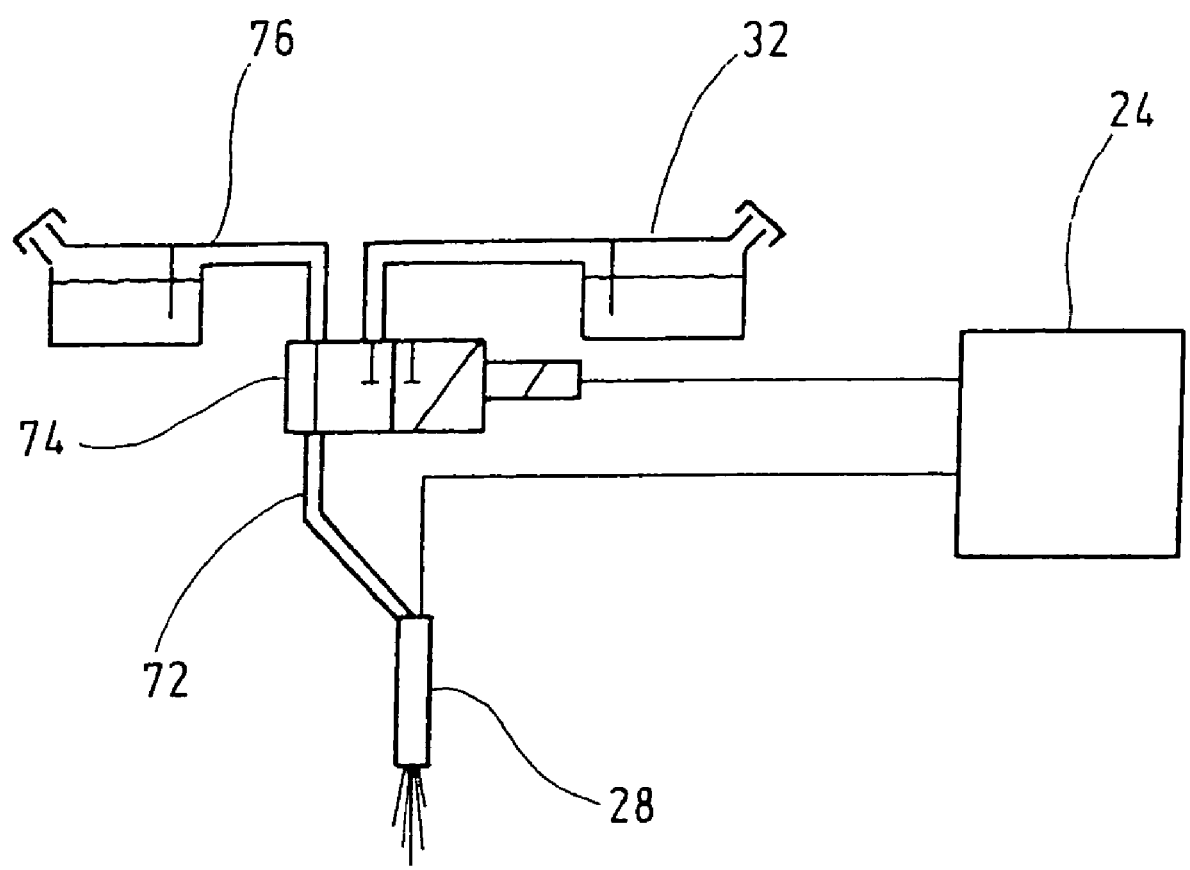
FIG. 3 Shows a schematic depiction of a fuel delivery system that allows switching between a starting fuel and a normal fuel.

FIG. 2 shows an exemplary embodiment of a method according to the present invention in the form of a flow chart of an engine management program of the type controlled by control device 24 within the framework of the technology described with reference to FIG. 1. Step 62 corresponds to a program for controlling internal combustion engine 10 that is carried out during normal operation of internal combustion engine 10. As soon as the internal combustion engine is to be shut off, the process branches off to step 64. In this step, the output of control signals for triggering ignition by spark plug 38 and for triggering the metering of fuel via injection valve 28 or canister-purge valve 30 is blocked.

Subsequently, as an option, a temperature T is compared with a temperature threshold value T_S, in step 66. This temperature comparison ultimately represents the temperature of the catalytic surfaces 44 of catalytic converter 42. Within the framework of an embodiment of the present invention, further measures for producing a high percentage of fuel vapor in the combustion chamber charge can be carried out only when temperature T is greater than the threshold value T_S. Threshold value T_S is set such that it can be assumed that, above the threshold value, pollutants are converted in catalytic converter 42.

As mentioned previously, the temperature of catalytic converter 42 or catalytic surfaces 44 can be measured directly using a temperature sensor 46, or they can be determined based on a model calculation carried out in control unit 24.

If temperature T determined via measurement or calculation is not greater than threshold value T_S, the response to the query in step 66 is negative, and the process branches to step 68. In this step, internal combustion engine 10 is shut off without triggering any measures for producing a high percentage of fuel vapor in the combustion chamber charge. The reason for this procedure is that, triggering methods for producing a high fuel vapor percentage in the combustion chamber charge when internal combustion engine 10 is shut off can result in the emission of hydrocarbons in exhaust-gas system 40 of internal combustion engine 10. To prevent hydrocarbons of this type from entering the environment, this emission is permitted only when the hydrocarbons can be converted in catalytic converter 42 into non-harmful exhaust-gas components. This is typically the case when temperature T exceeds threshold value T_S. In a case such as this, the response to query in step 66 is positive, and the process branches off to step 70. Step 70 triggers at least one measure for producing a high percentage of fuel vapor in the combustion chamber charge when internal combustion engine 10 is shut off.

A measure of this type can be, e.g., to supply combustion chambers 12 of internal combustion engine 10 only with vaporous fuel from charcoal filter 34 and the gas space in tank 32 when internal combustion engine shuts down. For this purpose, canister-purge valve 30 is triggered to open in step 70 shown in FIG. 2. During the final revolutions of internal combustion engine 10, fuel vapor is therefore drawn into combustion chambers 12 via canister-purge valve 30. Since the fuel that can be drawn in via canister-purge valve 30 is already vaporous, this measure results in a high percentage of fuel vapor in the combustion chamber charge. When internal combustion chamber 10 is subsequently restarted, the charge in combustion chamber 12 with a high percentage of fuel vapor ignites particularly easily and burns more completely than when liquid fuel is injected after internal combustion engine 10 was shut off.

Canister-purge valve 30 can be opened such that the fuel vapor is drawn into combustion chambers 12 while internal combustion engine 10 is shutting down, but is not discharged out of combustion chambers 10. For control of this type, canister-purge valve 30 is intentionally not opened until immediately before internal combustion engine 10 comes to a standstill. As a result, the emission of hydrocarbons from combustion chambers 12 of internal combustion engine 10 into exhaust-gas system 40 is prevented or at least reduced. This type of control is therefore also possible at low catalytic converter temperatures. In other words: This type of control can be carried out in conjunction with a sequence of steps 62, 64 and 70 according to FIG. 2, so that the optional temperature query carried out in step 66 is not carried out in this case.

As an alternative, it can therefore be an advantage, in combination with step 66 according to FIG. 2, to open canister-purge valve 30 even earlier while internal combustion engine 10 is shutting down. When canister-purge valve 30 is opened at the right time, fuel vapor from the canister-purge system, fuel tank 32, charcoal filter 34 and canister-purge valve 30 is drawn into combustion chambers 12 of the internal combustion engine and is discharged, unburned, into exhaust-gas system 40 with catalytic converter 42. The unburned hydrocarbons in exhaust-gas system 40 react exothermically in catalytic converter 42, provided the actual temperature is below its light-off temperature.

As a result, as mentioned above, the cooling-down of catalytic converter 42 can at least be delayed.

As an alternative, or in addition to the control of canister-purge valve 30, with internal combustion engines 10 with variable valve control, exhaust valves 18 can be closed with delay or not at all. As a result of this measure, the dwell time of the fuel vapor/air mixture in combustion chambers 12 of internal combustion engine 10 is extended and the likelihood that unburned hydrocarbons will reach exhaust-gas system 40 is reduced. This type of exhaust-valve control is therefore recommended at low temperatures.

As an alternative thereto, at a higher temperature T, exhaust valves 18 of combustion chambers 12 can also be opened earlier than in normal operation, in order to direct unburned hydrocarbons into exhaust-gas system 40. As a result of this measure as well, the cooling-down of catalytic converter 42 when internal combustion engine 10 comes to a standstill is delayed.

As an alternative or in addition thereto, to trigger canister-purge valve 30 and/or the changed triggering of exhaust valves 18 of internal combustion engine, in the case of a multiple-cylinder internal combustion engine, fuel is metered during a shutoff phase only to combustion chambers 12 whose pistons 14 are in the power stroke or compression stroke when internal combustion engine 10 comes to a standstill. As a result of this measure, a swing-down of internal combustion engine 10 during shutoff, i.e., an up and down motion of pistons 14 of internal combustion engine 12 caused by gas spring torques in combustion chambers 12, can be used to thermally prepare the combustion chamber charges that are enclosed in the compression stroke and power stroke.

Furthermore, as an alternative or in addition thereto, in the case of an internal combustion engine 10 with variable valve compression, the compression that occurs during shutoff of internal combustion engine 10 can be increased, since the increased compression induces a temperature increase during the swing-down phase, which also improves the thermal mixture preparation of the fuel/air mixture enclosed in the combustion chambers whose pistons are in the compression stroke or the power stroke. In the case of an internal combustion engine 10 with variable compression, the compression that is increased during shutdown of internal combustion engine 10 is advantageously combined with a reduction in compression upon subsequent restart of internal combustion engine 10. As a result of the reduced compression upon restart, there is less compression work to be carried out upon restart. As a result, it is easier overall to run the internal combustion engine up to speed after restart, that is, a faster increase in engine speed upon restart is enabled.

What is claimed is:

1. A method for charging at least one combustion chamber (12) of a spark-ignition combustion engine (10) with fuel and air, at least one combustion chamber charge being produced during a shutoff phase of the internal-combustion engine (10) and being ignited when the internal-combustion engine (10) is subsequently started, wherein, during the shutoff phase, at least one measure is taken to produce a high percentage of fuel vapor in the combustion chamber charge, and wherein, the at least one measure taken to produce a high percentage of fuel vapor is to open a canister-purge valve (30) when the internal-combustion engine (10) is shut off.

2. The method as recited in claim 1, wherein the measure is carried out only when a predetermined temperature threshold value has been exceeded.

3. A method as recited in claim 1, wherein, with a multiple-cylinder internal-combustion engine (10), fuel is metered during a shutoff phase only into those combustion chambers (12) whose pistons (14) are positioned in the power stroke or compression stroke when the internal-combustion engine (10) has come to a standstill.

4. The method as recited in claim 3, wherein, with an internal-combustion engine (10) with variable valve control, exhaust valves (18) of the combustion chambers (12) are opened with delay or not at all.

5. The method as recited in claim 1, wherein, with a multiple-cylinder internal-combustion engine (10), fuel is metered during a shutoff phase into at least one combustion chamber (12) and is discharged, unburned, out of the combustion chamber (12).

6. The method as recited in claim 5, wherein it is carried out only when a predetermined temperature threshold value has been exceeded.

7. The method as recited in claim 1, wherein, with an internal-combustion engine (10) with variable compression, the compression is increased when the internal-combustion engine (10) is shut off.

8. The method as recited in claim 7, wherein the compression is reduced upon starting.

9. A control unit (24) for controlling a method for charging at least one combustion chamber (12) of a spark-ignition combustion engine (10) with fuel and air, at least one combustion chamber charge being produced during a shutoff phase of the internal-combustion engine (10) and being ignited when the internal-combustion engine (10) is subsequently started, wherein in said method, during the shutoff phase, at least one measure is taken to produce a high percentage of fuel vapor in the combustion chamber charge, and wherein, the at least one measure taken to produce a high percentage of fuel vapor is to open a canister-purge valve (30) when the internal-combustion engine (10) is shut off.

* * * * *